Nov. 20, 1934. E. S. JOHNSTON 1,981,554
FRUIT JUICE EXTRACTOR
Filed Aug. 19, 1931
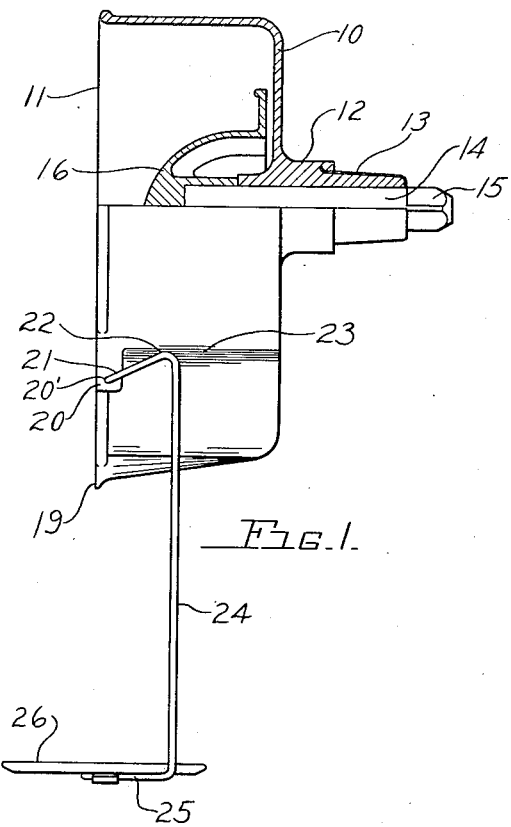
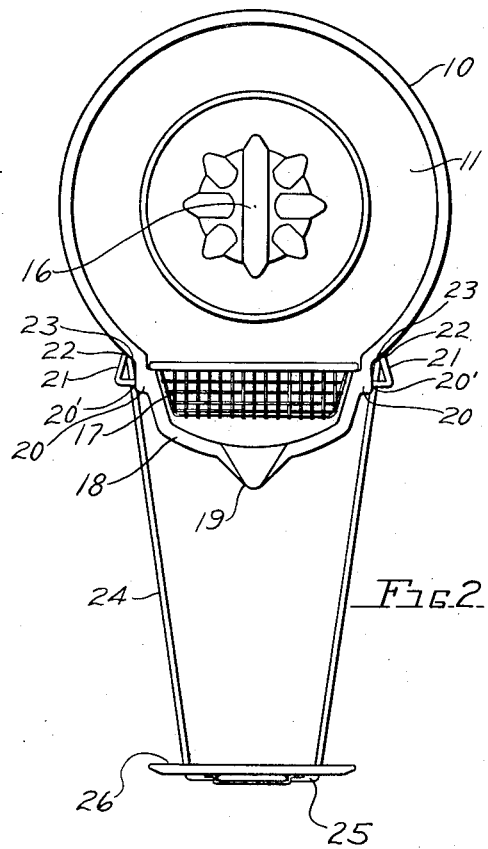
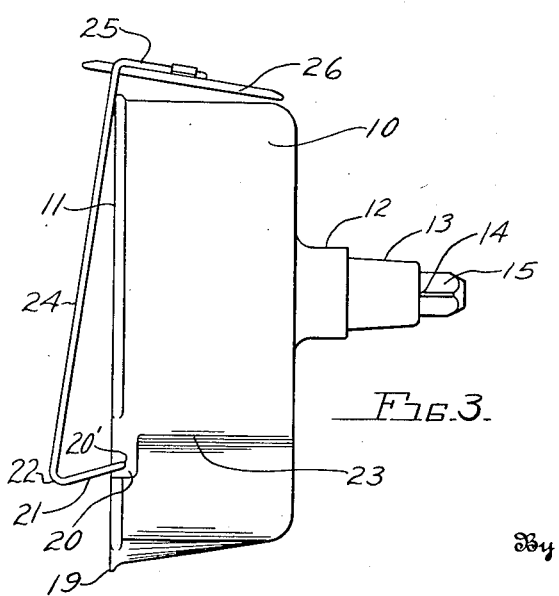
Inventor
Edward S. Johnston
By Maréchal and Noe
Attorneys Patented Nov. 20, 1934

1,981,554

UNITED STATES PATENT OFFICE 1,981,554

FRUIT JUICE EXTRACTOR

Edward S. Johnston, Troy, Ohio, assignor to The KitchenAid Manufacturing Company, a corporation of Ohio Application August 19, 1931, Serial No. 559,672

3 Claims. (Cl. 146—3)

This invention relates to food handling apparatus, and more particularly to a fruit juice extractor.

Another object of the invention is to provide a fruit juice extractor of this character having a removable platform on which a container may be placed for receiving the juice when the device is in use and so arranged that the platform may be removed when a larger container is used, or may be folded into a compact structure when the extractor is to be shipped or stored away after use.

An object of this invention is to provide a fruit juice extractor which is simple and economical in construction, will accommodate containers of different sizes and can be conveniently folded into a compact space.

Other objects and advantages of the invention will be apparent from the detailed description, the accompanying drawing, and appended claims.

In the drawing—

Fig. 1 is a side view partially in elevation and partially in vertical section of a device constructed in accordance with the present invention;

Fig. 2 is an end elevational view showing the device in operative position; and

Fig. 3 is a view showing the device in inoperative position in condition for shipment or storage.

Referring to the drawing, wherein there is illustrated a preferred embodiment of the invention, there is shown a housing 10 open at its front face 11, and having an extension 12 centrally located at the rear side thereof. Projecting from the extension 12 is a tapered mounting connection 13 adapted to removably support the device in a suitable oppositely tapered cooperating mounting. The projection 12 and member 13 are bored to provide a bearing for a rotatable shaft 14 which has squared end faces 15. This shaft is adapted to be driven from a suitable source of power which is connected to the squared end portion, and while the driving means may be of any desired construction, the device may conveniently be used as an attachment with the power driven mixing machine disclosed in the copending application, Serial No. 277,616 filed May 14, 1928. When thus employed as an attachment of this power driven mixing machine, the tapered portion 13 of the housing is removably fastened in a correspondingly tapered socket formed in the frame of the mixing machine in a position such that the squared end 15 of the shaft is connected within a correspondingly squared bore of a shaft of the machine driven from the power means thereof.

Within the housing 10 an extractor head 16, which may be of conventional design, is removably supported upon the extended end of shaft 14. This extractor head operates in the usual manner to remove the juice from fruit as the fruit is pressed against it, the juice then falling through a sieve or strainer 17 located below the head and from there to the bottom 18 of the housing and thence out the spout 19.

A boss 20 is formed at either side of the housing and drilled at 20' to removably receive the ends of a wire spring support 21, in which the tension of the wire is such as to resiliently press and maintain the wire ends within their respective sockets. The wire at each side is bent upwardly and inwardly to form an arm 22 which is adapted to abut against the exterior surface of the housing 10 as indicated at 23 to prevent further movement of the wire about the pivot points 20', when the support is moved to operative position. The wire at each side then extends downwardly and somewhat inwardly a predetermined distance as shown at 24, and is then bent at right angles to form a U-shaped loop 25 to provide a support to which is fastened as by soldering a platform 26 upon which a suitable container or tumbler may be placed.

The length of the wire is so chosen that the platform is spaced a sufficient distance from the spout 19 to support a glass of ordinary size directly under the spout to receive the extracted juice. The weight of the container acts to wedge the arms 22 of the wire against the curved portion 23 of the housing and there is thus provided a reinforcement for the platform making a strong and rigid support therefor. When it is desired to use a container of larger size, to catch the juice, such as a pitcher which can be held or mounted on a table or independent stand beneath the spout 19, this can be accomplished by pressing outwardly on each of the portions 24 of the wire to thereby remove the ends from their sockets 20' against the resiliency of the spring, when the wire support and platform may be entirely removed from the housing. The wire support and platform may be readily replaced by pressing the portions 24 outwardly and bringing the ends of the wire opposite the sockets 20', when the ends will then spring into place within the sockets upon release by the operator.

The construction of the wire support and platform is such that it can be swung forwardly about the pivoted mounting of the wire ends in sockets 20' from the position shown in Fig. 2 to the position shown in Fig. 3, in which the platform 26 and loop 25 overlie the top of the housing in closely compacted relationship. Such pivotal movement is limited by engagement of portions 24 of the wire with the upper forward edge of housing 10. This position greatly reduces the overall space required by the device for shipment, and for storage by the operator when not in use, while maintaining the complete assembly of the device and thereby minimizing the danger of misplacement and loss of the wire support and platform. The compacted position of the device is also such as to minimize danger of bending or other injury to the wire support, and the latter may be easily and instantly swung about its pivotal mounting to operative or inoperative position as desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a fruit juice extractor, a housing provided with a spout, a shaft, an extractor head mounted on the shaft, a platform beneath the housing adapted to support a container in cooperative relationship with the spout, and means pivoted in said housing and engaging said housing at a point removed from the pivot for supporting and bracing said platform to provide a strong and rigid support therefor.

2. In a fruit juice extractor, a housing provided with a spout, a shaft, an extractor head mounted on the shaft, said housing having oppositely facing sockets arranged at opposite sides of said spout, a bent spring wire having opposite ends resiliently and removably mounted in said sockets to provide a pivotal mounting, said wire having opposite side portions extending downwardly in operative position and providing a supporting surface beneath said spout, and a platform carried by said supporting surface, said wire being adapted to engage said housing in operative position thereof to thereby brace said wire and platform.

3. In a fruit juice extractor, a housing member, a shaft journaled in said housing member, an extractor head mounted on the shaft, spring means pivotally attached to said housing and extending downwardly in operative position to provide a supporting surface below said housing, and a platform associated with said supporting surface, said spring means being adapted to engage said housing in operative position at a point spaced from its point of pivotal attachment to thereby brace said spring and said platform.

EDWARD S. JOHNSTON.